United States Patent
Braun et al.

(10) Patent No.: US 7,407,575 B2
(45) Date of Patent: Aug. 5, 2008

(54) FILTERING STRUCTURE FOR SWIMMING POOL

(75) Inventors: Jacques Braun, Seppois le Bas (FR); Pierre Baysse, Seppois le Bas (FR); Pierre Le Guillou, Le Rheu (FR)

(73) Assignees: Piscines Waterair S.A., Seppois le Bas (FR); Procopi S.A., Le Rheu (FR)

( * ) Notice: Subject to any disclaimer, the term of this patent is extended or adjusted under 35 U.S.C. 154(b) by 196 days.

(21) Appl. No.: 10/491,177

(22) PCT Filed: Sep. 30, 2002

(86) PCT No.: PCT/FR02/03333

§ 371 (c)(1),
(2), (4) Date: Aug. 13, 2004

(87) PCT Pub. No.: WO03/028847

PCT Pub. Date: Apr. 10, 2003

(65) Prior Publication Data

US 2004/0256300 A1   Dec. 23, 2004

(30) Foreign Application Priority Data

Oct. 1, 2001   (FR) .................................. 01 12635

(51) Int. Cl.
   *B01D 35/027*   (2006.01)
(52) U.S. Cl. ................. 210/167.12; 210/175; 210/416.2
(58) Field of Classification Search .................. 210/94, 210/138, 143, 167, 169, 198.1, 232, 416.1, 210/416.2, 488, 489, 748, 167.1, 167.12, 210/175

See application file for complete search history.

(56) References Cited

U.S. PATENT DOCUMENTS

| 1,884,022 | A | * | 10/1932 | Lunati | .......................... 60/481 |
| 1,920,371 | A | * | 8/1933 | Franke | ......................... 417/61 |
| 1,993,267 | A | * | 3/1935 | Ferguson | ...................... 415/11 |
| 2,619,231 | A | * | 11/1952 | Abbott, Jr. | ................... 210/171 |
| 3,972,647 | A | * | 8/1976 | Niedermeyer | ................... 417/2 |
| 4,036,756 | A | * | 7/1977 | Dockery | ..................... 210/169 |
| 4,151,810 | A | * | 5/1979 | Wiggins | ..................... 119/262 |
| 4,392,953 | A | * | 7/1983 | Cornelius et al. | ........... 210/169 |

(Continued)

FOREIGN PATENT DOCUMENTS

| DE | 2331376 | * | 4/1975 |
| EP | 0 544 610 | | 6/1993 |
| FR | 2 715 326 | | 7/1995 |
| FR | 2830461 | * | 4/2003 |

*Primary Examiner*—Fred G. Prince
(74) *Attorney, Agent, or Firm*—Ohlandt, Greeley, Ruggiero & Perle L.L.P.

(57) ABSTRACT

A filtering structure intended to be incorporated a vertical swimming pool wall has a filtering device and a pumping device with the pumping device having an electrical part, including an electric motor, and a hydraulic part equipped with a turbine. The filtering structure has a suction port facing towards a nominally horizontal access passageway partly submerged in water, and emerging towards a nominally vertical tank arranged thereunder. The filtering structure has a tank communicating with a nominally vertical column, partly in the upper part of which is arranged the hydraulic part. The electrical part is arranged above the level of the water to be treated and is contained in the nominally horizontal access passageway, while the hydraulic part is immersed in a volume of filtered water.

12 Claims, 5 Drawing Sheets

U.S. PATENT DOCUMENTS

| | | | |
|---|---|---|---|
| 4,512,724 A * | 4/1985 | Horvath | 417/319 |
| 4,817,561 A * | 4/1989 | Byrne et al. | 119/260 |
| 4,944,871 A * | 7/1990 | Ogawa | 210/169 |
| 5,095,851 A * | 3/1992 | Bourg | 119/223 |
| 5,277,800 A * | 1/1994 | Dieckmann et al. | 210/169 |
| 5,800,703 A | 9/1998 | McGregor | |
| 5,879,547 A | 3/1999 | Jandros et al. | |
| 2006/0021922 A1 * | 2/2006 | Lamberts Van Assche | 210/169 |

* cited by examiner

FILTERING STRUCTURE FOR SWIMMING POOL

CROSS REFERENCE TO RELATED APPLICATIONS

The present application claims priority of PCT International Application No. PCT/FR02/03333, filed on Sep. 30, 2002, and French Application No. 01/12635, filed on Oct. 1, 2001.

BACKGROUND OF THE INVENTION

1. Field of the Invention

The present invention concerns the field of swimming pool water filtration and, more particularly, relates to a filtering structure designed to be incorporated in one of the generally vertical walls of a swimming pool.

2. Description of Related Art

A plurality of filtering devices of this type has to date been proposed. They comprise mainly a portion immersed in the water of the swimming pool, equipped with a suction port and a discharge outlet for water once it has been filtered. They also comprise filtering and pumping means located outside the pool basin, either at a locality technically developed for this purpose at a more or less considerable distance from the pool basin, or in a space such as a casing, directly adjacent to the immersed portion.

The pumping and filtering means, such as, for example, sand or cartridge filters or filtering bags, are interconnected by Connecting pipes, the said pumping and filtering means allowing the passage of water through the Connecting pipes. The unit is furthermore connected to a suction port by way of suction pipes and to a discharge outlet by way of backflow pipes.

The presence of these pipes, even if less important when the filtering and pumping device is in the form of a casing, inevitably brings about load losses diminishing the performance of the known Systems. These losses are generally compensated for by using "oversized" pumping means, in particular with regard to the electric motor. Moreover, in the prior art devices the Connecting pipes often pass above the water level, resulting in priming difficulties.

The use of oversized pumping means results of necessity in increased production costs, but also in higher energy consumption and therefore higher electricity bill of the owner of a pool equipped with such devices.

It is imperative that the pipe unit is perfectly watertight in order to prevent leaks or the intake of air detrimental to the proper functioning of the unit.

Furthermore, the devices whose pumping and electric control means are arranged in an underground location adjacent to or remote from the immersed portion, are subjected to flooding in case of heavy rains, resulting inevitably in serious damage to the pumping system or imposing considerable and costly work in order to carry out gravitational drainage at the bottom of the technical location.

SUMMARY OF THE INVENTION

It is the object of the invention to overcome the above mentioned drawbacks.

For this purpose the invention proposes a filtering structure designed to be incorporated in one of the generally vertical walls of a swimming pool, comprising filtering and pumping means consisting of an electric part including in particular an electric motor, and a hydraulic part, equipped with a turbine, the said structure comprising a suction port facing towards a generally horizontal access passageway submerged partly in the water and emerging towards a generally vertical tank arranged thereunder and wherein are arranged the filtering means, for example a filtering bag, the said tank communicating with a generally vertical column, partly in the upper part of which is arranged the hydraulic part of the pumping means.

The main characteristic of this structure resides in the fact that the electric part of the pumping means is disposed above the level of water to be treated, contained in the generally horizontal access passageway, while the hydraulic part is immersed in the volume of filtered water.

The generally horizontal access passageway serves as what the person skilled in the art denotes by the Anglicism "skimmer", meaning that it treats the superficial layers of a liquid and forming in effect an integral part of the tank interior.

With the filtering structure configured in this manner, suction pipes are completely dispensed with and the backflow pipes are limited or even done away with, the volume containing the filtering means being in direct contact with the volume containing the hydraulic part of the water pumping means.

The disposition in this manner puts a complete end to load losses as a result of pipes such as those in the prior art and allows the utilisation of more economical and less energy-consuming pumping means.

The positioning of the motor above the water level allows to obviate water-tightness between electric and hydraulic pump parts which are always difficult to realise and to maintain. Finally, the fact that the motor is positioned in the upper portion of the filtering structure rather than laterally makes the unit more compact and easier to access.

Preferably, the motor is supported by a flange forming part of the upper side of the generally horizontal access passageway.

Also preferably, the electric motor is in a vertical position, substantially normal to the hydraulic part of the pumping means, the transmission between the said electric motor and the said hydraulic part coming about with the aid of a generally vertical transmission shaft traversing the generally horizontal access passageway. This disposition allows in addition good transmission of the torque and the motor speed to the hydraulic part.

However, it is conceivable to place the motor in a horizontal position. Its output shaft will then be normal to the generally vertical transmission shaft controlling the hydraulic part. The transmission of the motor movement comes about conventionally in this case by way of bevel gears or ring and pinion gearing.

A casing disposed in the access passageway protects the transmission shaft between the electric motor and the hydraulic part of the pumping means.

With a view to improve the safety of the invention even more, the electric parts associated with the motor are arranged above the water, in the upper part of the generally horizontal access passageway.

As a matter of fact, these electric parts group together the conventional electric controls of this equipment, i.e., in particular, an on-off switch, a timer etc.

Their accessibility, particularly with regard to maintenance, repair and winter storage, is made particularly easy by the fact that the electric components are contained in a detachable cassette. The latter may, by the way, be designed in a manner so as to encompass at least part of the motor body. This feature permits to further improve the compactness of the unit.

This cassette may thus readily be removed for placing it into storage during winter or for repair by simply disconnecting the said electric motor components, connected by way of fast connections. Repairs may then be readily carried out on site or, if necessary, in a workshop or at the factory.

The electric motor creates, by definition, a certain amount of heat which needs to be dispersed, in most cases by means of ventilators. Therefore, the presence of such ventilators is at the origin of serious noise problems and increases the space taken up by the motor. In order to overcome this problem, the electric motor according to the invention is preferably equipped with cooling means formed by an open circuit. This open circuit encompasses the body of the electric motor, one of its end sections being immersed in the water, contained in the access passageway while the opposite end section is either submerged in the generally vertical column equipped with pumping means, the circuit acting in that case in a depressurising manner, or in the backflow piping system arranged downstream from the hydraulic part contained in the said column, the circuit acting in that case in a pressurising manner.

As a matter of fact, this circuit takes the form of a coil of thermal conducting material, wherein the water circulates. A system of this type has the added advantage of being able to recover the calories of the electric motor in order to return them to the pool basin, acting in effect like a secondary water heating means.

In addition, it allows to reduce the height of the filtering structure, permitting the aesthetic improvement of the said structure once it has been set up.

Preferably, the hydraulic part of the pumping means comprises an outlet connected by backflow pipes to a backflow outlet laterally offset from on either side of the suction port according to the hydraulicity desired for the pool.

According to another configuration this hydraulic part may comprise two outlets connected by means of backflow pipes to two backflow ports laterally offset on either side of the suction port. Individual start-up of one of the outlets or of both at the same time also permits to choose the hydraulicity of the pool.

In this manner the user may, at his/her convenience modify the water flow in the pool and make the most of the shape of the swimming pool in order to avoid stagnation zones where the water would not be correctly turned over.

The invention will be better understood on the basis of the more detailed specification with reference to the accompanying drawings, wherein.

Figure 2:
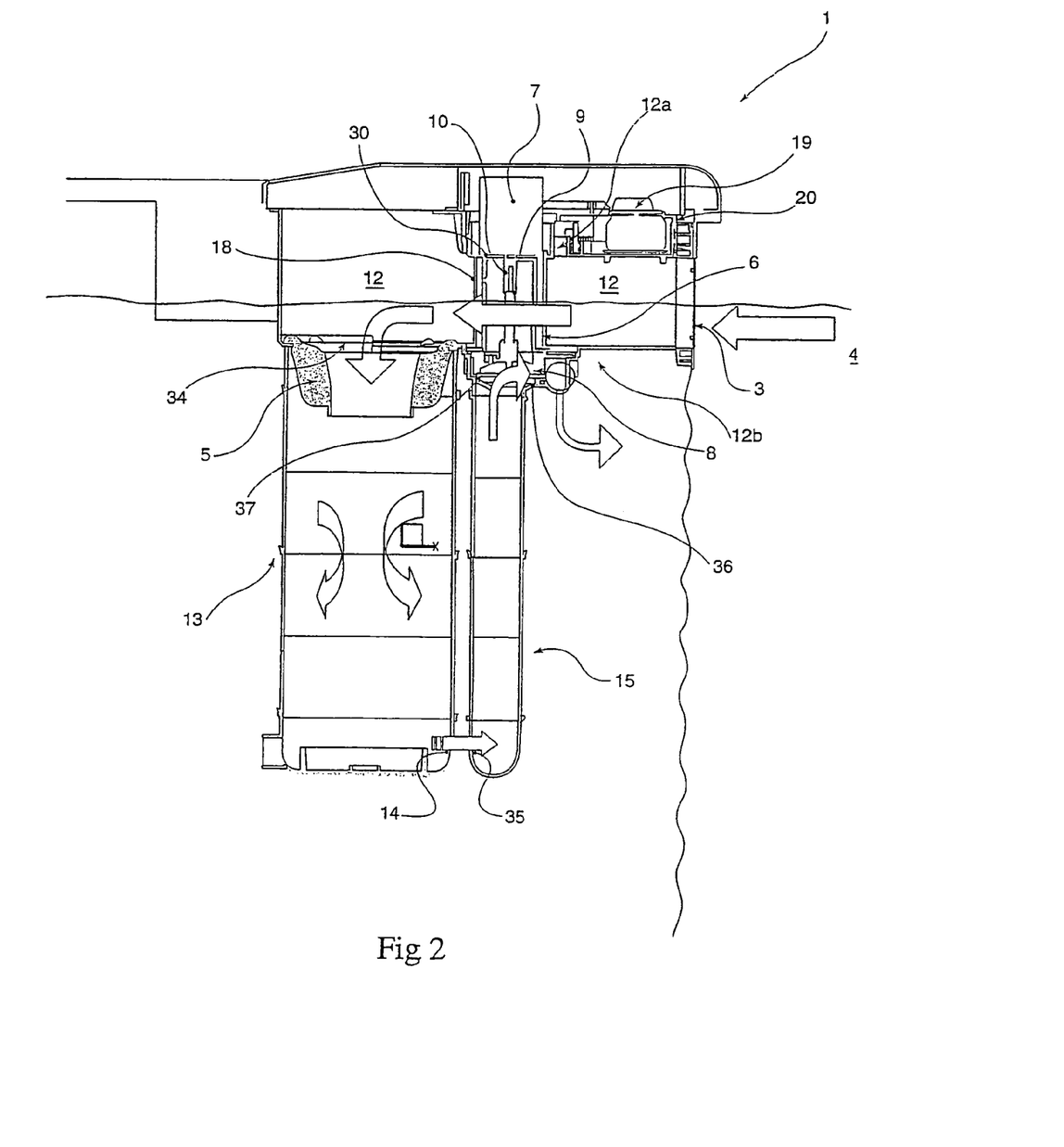
FIG. 2 represents a side elevation thereof in longitudinal section.

The filtering structure (1) according to the invention is incorporated in the generally vertical wall (2) of a swimming pool and comprises a suction port (3) partly immersed in the water (4) of the pool basin, the level of which is shown in FIG. 2 by an uneven line. Referring to this figure, the filtering structure (1) according to the invention also comprises filtering means and pumping means (6). The pumping means (6) are composed of an electric motor (7) associated with a hydraulic part (8) composed of a flange (36) in which a turbine (37) is accommodated and intended for immersion in the water in the course of a filtering cycle to move it. The electric motor (7) drives the hydraulic part (8) by means of a transmission shaft (9) on which the turbine (37) is fixed. In the embodiment shown in particular in FIG. 2, the motor (7) is in a vertical position and its output shaft (10) is coupled to the transmission shaft (9).

The suction port (3) opens towards a generally horizontal access passageway (12), likewise partly submerged in the water (4) of the pool basin. This access passageway (12) is substantially parallelepipedic and its lower side (12b) includes an aperture (34) emerging towards a generally vertical tank (13).

This tank (13) comprises filtering means which are explained in more detail in what follows in the description. It comprises in the lower portion a lateral inlet (14) facing, via an inlet (35), towards the lower portion of a generally vertical column (15). The latter is oriented parallel to the tank (13). This column acts as suction upstream from the hydraulic part (8) of the pumping means.

According to a different embodiment, the flange (36) of the hydraulic part may be moulded into the body of the filtering structure at the level of the upper portion of the column (5).

Two outlets are provided at the level of the hydraulic part (8) making it possible to direct the water flow via two backflow pipes (16a, 16b) towards two backflow inlets (17a, 17b), laterally offset on either side of the suction port (3). During assembly, the user may thus choose the inlet located on the right or the left hand side of the port (3) depending on the sense of rotation one wishes the water flow in the pool to have. He may also choose to use both inlets (17a, 17b) at the same time in order to bring about an "inverse hydraulicity", i.e. to direct the flow of the backflow towards the bottom of the swimming pool wall opposite the filtering structure so that the same flow comes back to the surface towards the suction port (3).

The filtering structure such as it has been described above permits to obviate, in comparison to the prior art configurations, the suction and connection pipes between the tank (13) and the column (15) and to limit the backflow pipes (16).

The electric motor (7) is disposed above the water level and is supported by a flange (30) forming part of the upper side (12a) of the generally horizontal access passageway (12) (see FIG. 2).

The transmission shaft (9), traversing, in effect, the access passageway (12), is protected by a casing (18) disposed between the upper (12a) and lower (12b) sides of the latter. This casing (18) further allows to prohibit any water splashing towards the motor (7).

Figure 6:
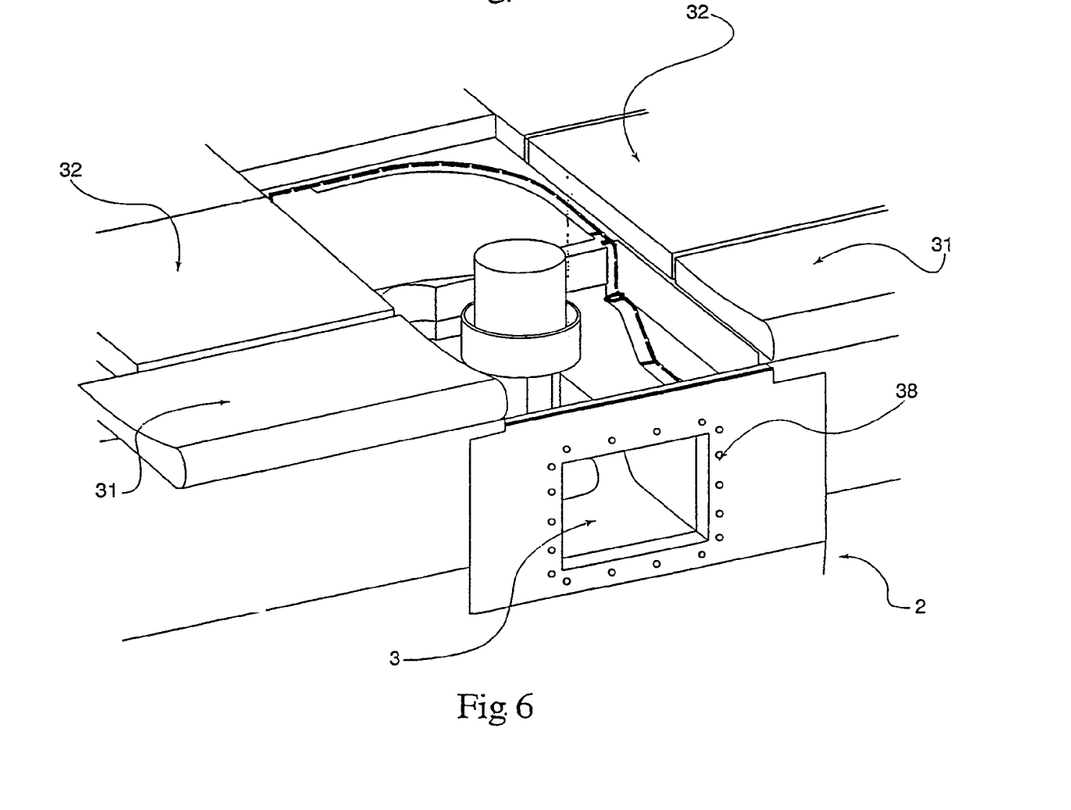
FIG. 6 is a close-up view showing in perspective the front of the structure, side of the pool.

The electric components (19) (see FIG. 1) associated with the motor (7) are likewise installed above the water level in the access passageway (12). These electric components are conveniently positioned in a detachable cassette (20). FIG. 6 by the way shows the filtering structure (1) with the cassette removed from it.

Figure 5:
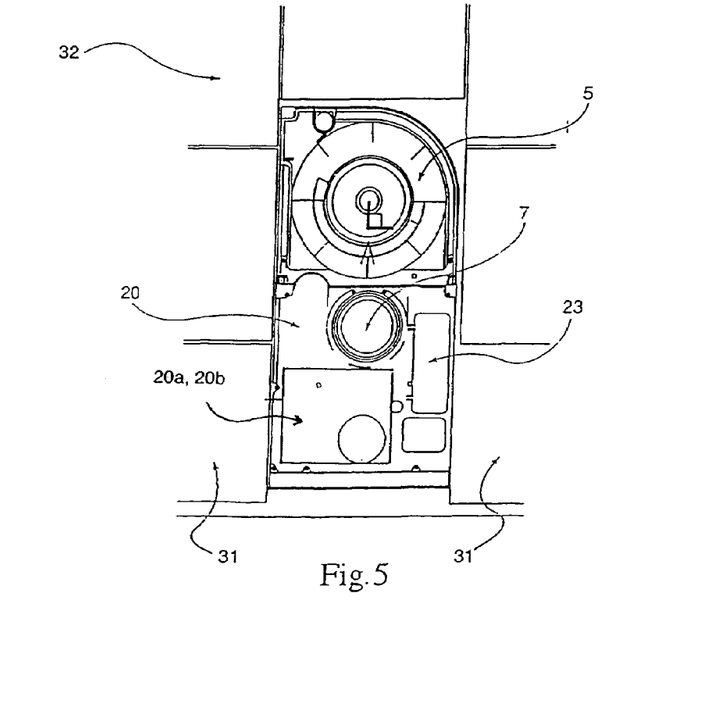

The cassette (20) is so adapted as to encompass in part the casing of the motor (7) (see, in particular, FIG. 5), protruding from it towards the top. It may, in addition, comprise in the upper portion a fixed, hinged glass casing (23). This glass casing (23) allows convenient access to certain electrical controls of the motor (on-off switch, timer etc.), protecting them against possible water splashes.

According to a variation, not shown, the cassette (20) further accommodates, at locations provided for that purpose, the electrical parts associated with devices such as a heating resistor (20a) and/or an automatic water treatment device (20b), for example an electrolyser, these devices being fixed in that case on the cassette and brought into contact with the water in the access passageway (12), the tank (13) and/or the column (15).

The fact that an electrolyser or a heating resistor may be added to the cassette offers a real advantage compared with the prior art. As a matter of fact, this configuration permits the incorporation into the filtering structure of new technical devices without being obliged to add supplementary elements such as pipes, connections or equivalent means.

What is attained, therefore, is simplicity of installation of new devices, the absence of load losses due to pipes and connections and the elimination of the risk of leaks. In addition, the maintenance of these optional devices may be performed without having to work on the pipes owing, in particular, to the wide dimensions of the suction column and the presence of the aperture in the cassette.

A removable lid (24) protects the upper side of the access passageway (12) and makes it possible for the user or a technician to readily gain access to the filtering and pumping means.

Figure 3:
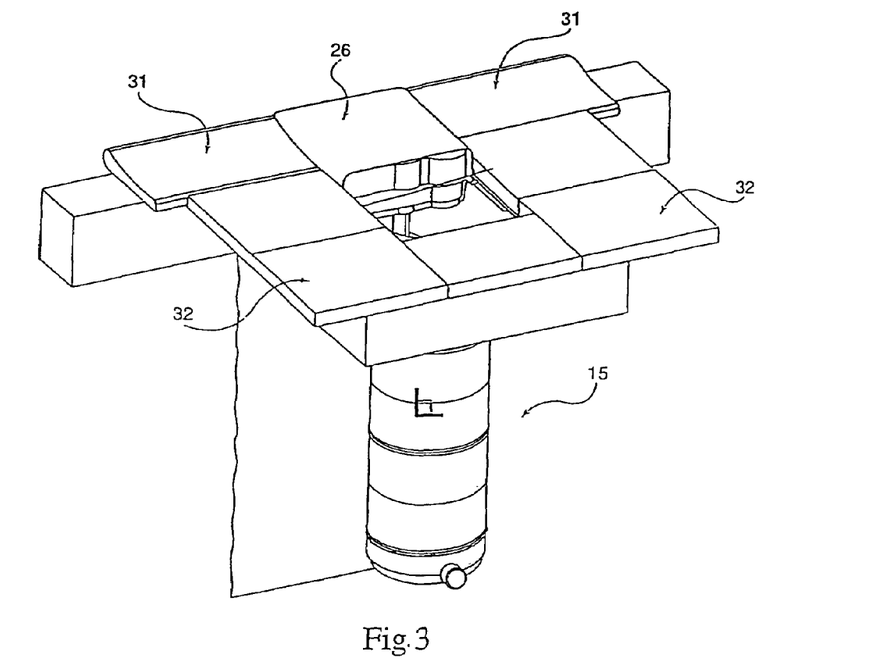
FIG. 3 represents a perspective rear view of the said structure.

This lid (24) has a front portion (25) proximal to the pool basin and a rear or distal portion (26) granting access respectively to the pumping and filtering means. The contact zones of these two portions (25, 26) are formed in such a manner that the removal of the front portion (25), protecting in effect the electrical parts of the pumping means, depends on first removing the rear portion (26) (see FIG. 3).

Figure 4:
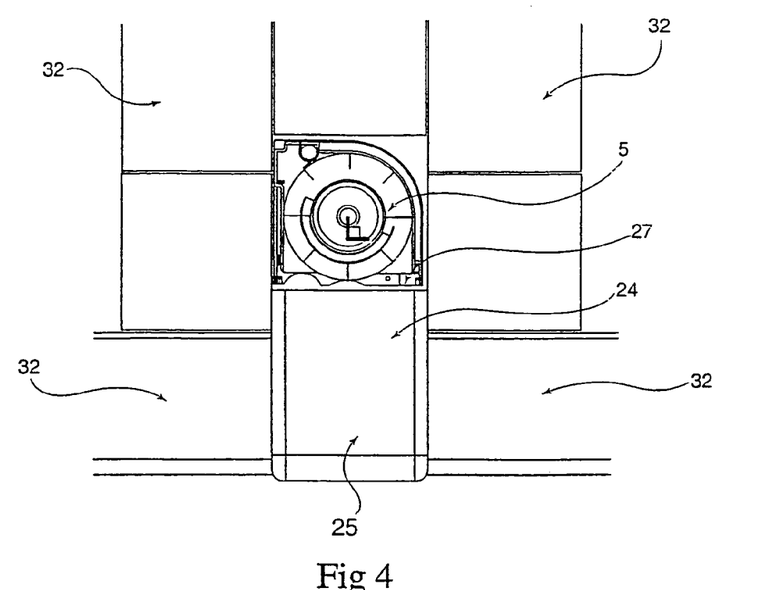
FIGS. 4 and 5 are views from the top, permitting to see in more detail the constituent elements of the invention.

In fact, this configuration of the lid (24) is designed to limit as much as possible the splashing of water which might occur. Again with a view to safety, the front portion (25) furthermore comprises a locking latch (27) (see FIG. 4), which can, for example, only be released by means of a tool such as a screwdriver.

Figure 1:
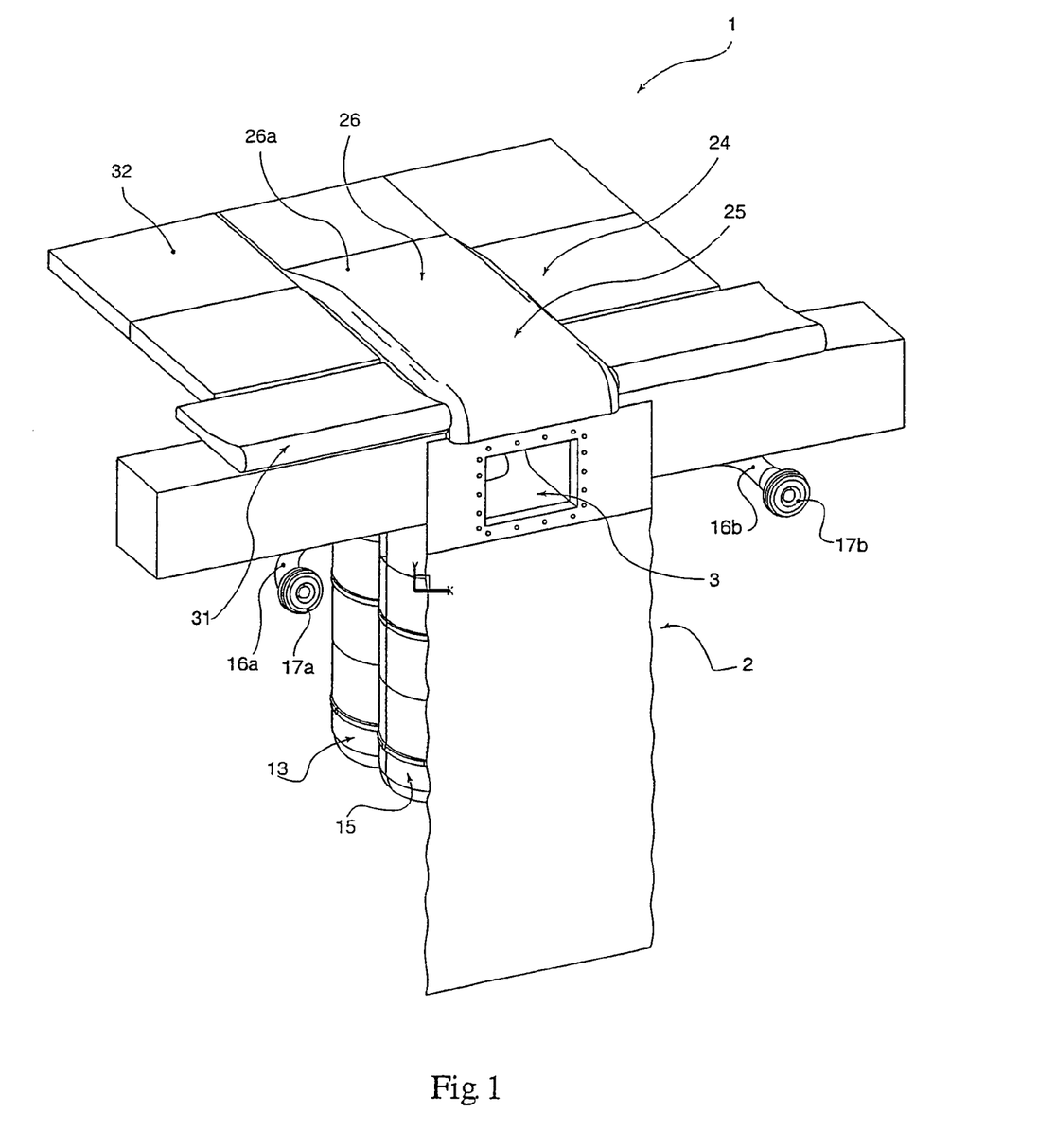
FIG. 1 represents a perspective view of a filtering structure according to the invention.

As shown in FIG. 1, the lid (24) is aesthetically perfectly integrated in the pool basin as well as in its immediate environment. For that purpose it comprises an outer side whose generally rectangular periphery has rounded-off edges and an inclined plane (26a) connecting an elevated surface to copings (31) arranged along the pool basin and to the tiling (32) surrounding it.

Figure 7:
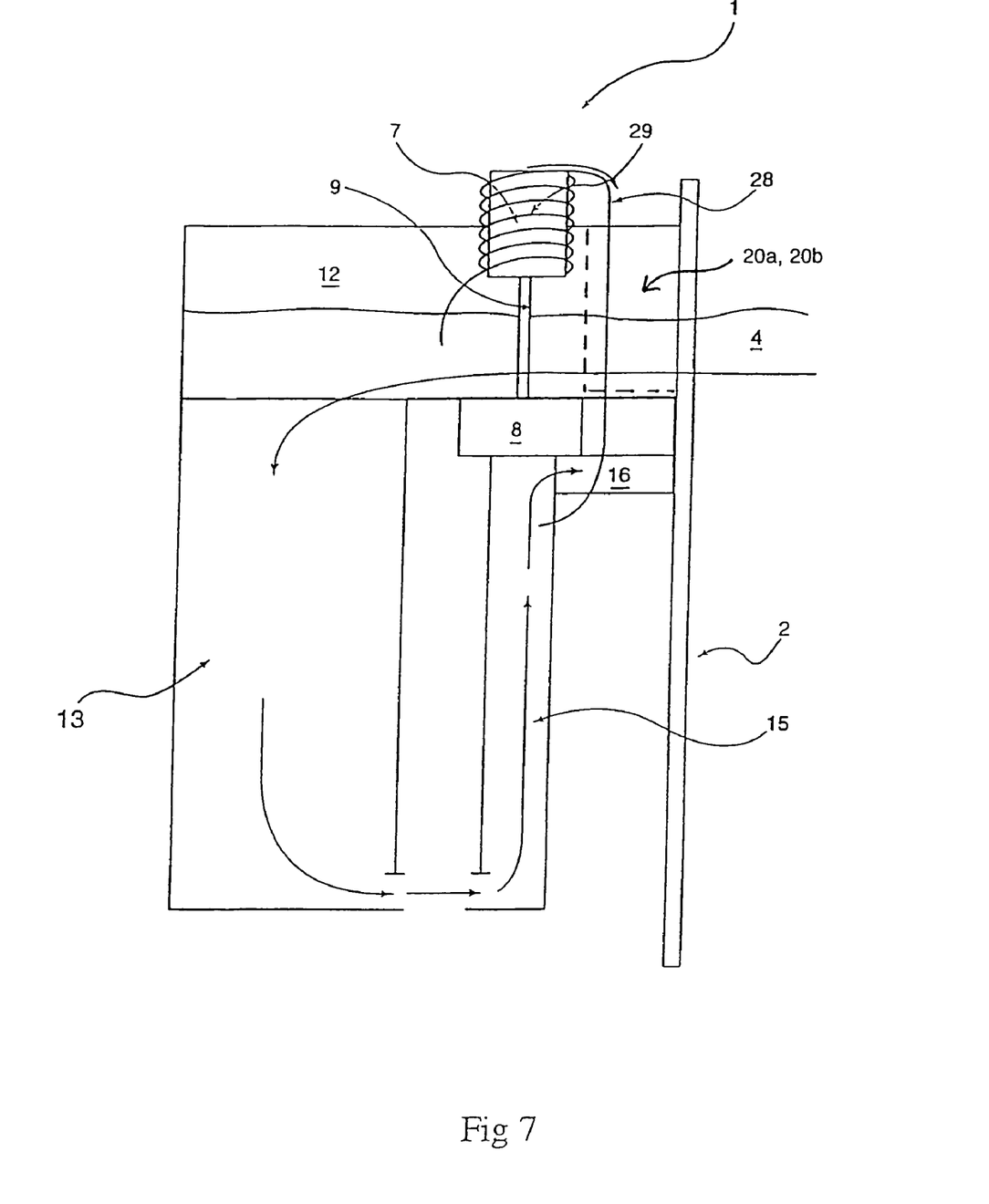
FIG. 7 is a schematic view showing the cooling device of the motor.

The electric motor (7) comprises, as already mentioned, cooling means, which may be realised by an open hydraulic circuit (28) (see FIG. 7), taking the form of a coil (29, formed by a small pipe made of thermal conductive material wound around the motor, through which passes the water of the pool basin. For this purpose, one of the end sections of the circuit "bubbles through" the access passageway (12) while the other end section is situated in the generally vertical column (15) in the part forming the suction column. The open circuit acts in that case in a depressing manner.

According to a different embodiment, not shown, the open circuit may have an end section, immersed in the passageway (12) and its opposite end section, disposed in the backflow pipes and connections (16) downstream of the hydraulic part (8) of the pumping means (6). The open circuit acts in that case in a pressurising manner.

The filtering means which are specially adapted to the filtering structure (1) of the invention, take the form, for example, of a disposable filtering element (not shown) comprising an exterior bag with strong filtering power and an interior bag with weak filtering power, the unit being topped by a generally cylindrical hollow piece (5) flared in the upper section and equipped at its upper end section with a flange cooperating with the aperture (34) of the tank (13) (see FIG. 2).

Alternatively, it is also possible to use a sand filter or one or more cartridge filters, known per se.

The aforegoing description should be considered as an example only of implementing the invention, which is in no way exhaustive of the latter. On the contrary, the invention includes all variations in form and configuration available to the person skilled in the art.

The invention claimed is:

1. A filtering structure for incorporating in the generally vertical walls of a swimming pool basin, comprising means for filtering and means for pumping, said means for pumping including an electrical part and a hydraulic part equipped with a turbine, said electrical part including an electric motor, said structure comprising a suction port facing towards a generally horizontal access passageway partly submerged in water, and emerging towards a generally vertical tank arranged thereunder and wherein are arranged said means for filtering, said vertical tank communicating with a generally vertical-column, partly in an upper part of which is arranged said hydraulic part of the means for pumping, and wherein the electrical part of the means for pumping is disposed above the level of the water to be treated, contained in said generally horizontal access passageway while said hydraulic part of the same means for pumping is submerged in a volume of filtered water.

2. The filtering structure of claim 1, wherein said electric motor is supported by a flange forming one portion of a upper side of said generally horizontal access passageway.

3. The filtering structure of claim 1, wherein said electric motor is in a vertical position, substantially normal to said hydraulic part, and wherein said electric motor and said hydraulic part have a transmission therebetween that is performed by way of a vertical transmission shaft traversing the generally horizontal access passageway.

4. The filtering structure of claim 3, further comprising a casing arranged in the generally horizontal access passageway to protect said transmission shaft.

5. The filtering structure of claim 1, wherein said electric motor has an electrical component, which is disposed above the water, in an upper part of said generally horizontal access passageway.

6. The filtering structure of claim 5, wherein said electrical component is contained in a detachable cassette.

7. The filtering structure of claim 6, wherein said cassette can encompass at least part of said electric motor.

8. The filtering structure of claim 6, wherein said cassette accommodates electrical parts associated with a heating resistor and/or an automatic water treatment device, and wherein said heating resistor and/or automatic water treatment device are fitted on said cassette and placed in contact with water in said generally horizontal access passageway, said vertical tank and/or said vertical column.

9. The filtering structure of claim 1, wherein said electric motor is equipped with means for cooling comprising an open hydraulic circuit.

10. The filtering structure of claim 1, wherein said hydraulic part comprises an outlet connected via a backflow pipe to a backflow inlet laterally offset on either side of a suction port according to a desired hydraulicity to be conferred to the pool basin.

11. The filtering structure of claim 1, wherein said hydraulic part comprises two outlets connected via backflow pipes to two backflow inlets laterally offset on either side of a suction port, the individual operation of one of the two outlets or the simultaneous operations of two of said outlets permitting the selection of the hydraulicity of the pool basin.

12. A filtering structure for filtering a liquid having a top surface, the structure comprising:

a pumping means having an electrical part and a hydraulic part, said electrical part being disposed above the surface of the liquid and said hydraulic part being disposed below the surface of the liquid, wherein the filtering structure is incorporated in a wall of a basin, wherein the filtering structure is disposed near or is part of a generally horizontal access passageway in said wall, wherein said electric part is an electric motor, wherein said electric motor is in a vertical position, substantially normal to said hydraulic part, and wherein said electric motor and said hydraulic part have a transmission therebetween that is performed by way of a vertical transmission shaft traversing a generally horizontal access passageway.

* * * * *